United States Patent

[11] 3,556,262

[72] Inventor Edward K. Dombeck
 South Bend, Ind.
[21] Appl. No. 792,903
[22] Filed Jan. 15, 1969
[45] Patented Jan. 19, 1971
[73] Assignee The Bendix Corporation
 a corporation of Delaware

[54] APPLICATOR ADJUSTER
 2 Claims, 3 Drawing Figs.
[52] U.S. Cl. ................................................. 188/79.5,
 188/196
[51] Int. Cl. ....................................................F16d 51/52,
 F16d 65/56
[50] Field of Search........................................... 188/
 79.56C, 196RR

[56] References Cited
UNITED STATES PATENTS
3,460,653 8/1969 Wieger.......................... 188/79.5(GC)

Primary Examiner—Duane A. Reger
Attorneys—C. F. Arens and Plante, Arens, Hartz, Hix and Smith ABSTRACT: A drum brake including an automatic adjuster mechanism is disclosed which has the usual pair of brakeshoes and an extendible strut operated by rotation of a serrated wheel disposed between the ends of the shoes. An adjuster lever which engages the serrated wheel includes a tab which extends through a D-shaped opening provided in one of the shoes. The D-shaped opening provides a substantially flat sliding surface and an arcuate camming surface in the brakeshoe. The camming surface urges the tab into engagement with the sliding surface when the adjuster functions normally, but permits the adjuster lever to slide in the opening when excess torque is applied to the lever when the adjuster mechanism malfunctions.

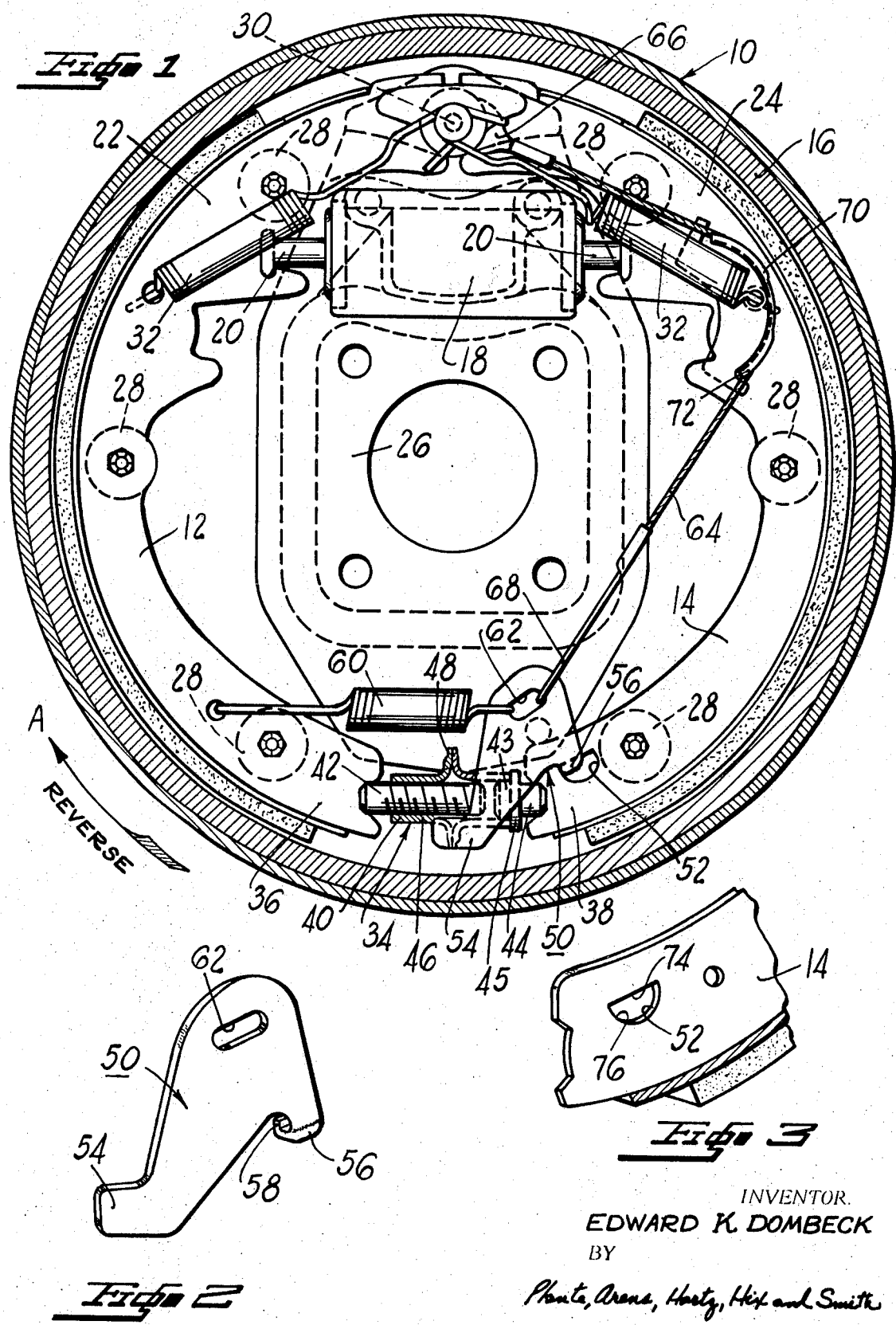

APPLICATOR ADJUSTER

SUMMARY OF THE INVENTION

It is an object of this invention to provide a brake with an application adjuster having a more simplified construction than the adjuster of copending U.S. application Ser. No. 656,852, now U.S. Pat. No. 3,460,653 having the same assignee.

It is an object of this invention to provide an improved application adjuster that employs a minimum number of parts and that is economical to manufacture.

It is an object of this invention to provide an application adjuster that includes a simplified safety feature to prevent damage to said adjuster in the event of malfunction.

It is an object of this invention to provide an application adjuster having a pawl with a locating element, the latter of which is operable upon a brake application to release the applied torque beyond a predetermined value to thereby prevent damage to said adjuster.

Other objects and features of the invention will be apparent from the following description of the application adjuster taken in connection with the accompanying drawings.

BRIEF DESCRIPTION OF THE DRAWINGS

FIG. 1 is a plan view of a brake assembly depicting the application adjuster of this invention;

FIG. 2 is an isometric detail view of the lever shown in FIG. 1; and

FIG. 3 is an enlarged fragmented view of the end of the brake shoe that pivotally carries the lever.

DESCRIPTION OF THE PREFERRED EMBODIMENT

Referring now to the drawing, and particularly FIG. 1; thereof, the numeral 10 represents a drum brake provided with brake shoes 12 and 14, which are urged against drum 16 in any suitable manner such, for example as by hydraulic wheel cylinder 18. The wheel cylinder 18 provides the actuating means for moving the shoes into engagement with the drum. The wheel cylinder 18 is conventional in form and is equipped with connecting links 20 which engage the respective ends 22 and 24 of the shoes 12 and 14. The shoes 12 and 14 are held in sliding engagement against a backing plate 26 by a plurality of holddown devices 28, which pass through the respective brakeshoes. A fixed anchor member 30 is secured to the backing plate 26 to receive the braking torque of the brakeshoes through one or the other of the shoe ends 22 and 24, depending upon the direction of rotation of the drum 16. If the drum 16 is rotating in a clockwise direction, the two shoes 12 and 14 anchor as a unit at the end of shoe 12 against the fixed anchor member 30. Springs 32 are connected between the anchor member 30 and the ends 22 and 14, respectively, of the brakeshoes 12 and 14 to thereby hold said shoes in a retracted position against the anchor member 30, and thus, out of contact with the drum 16.

An automatic brakeshoe adjuster 34 is interposed between ends 36 and 38 of the shoes 12 and 14, respectively, for making the necessary adjustments to the shoes as they become worn. The adjuster 34 includes an extendable strut 40 which comprises an externally threaded member 42 one end of which is forked for engagement with end 36 of brakeshoe 12. An end portion 44 is provided with a smooth external portion 43 and flange 45, and a forked end which engages end 38 of brakeshoe 14. Additionally, the extendable strut also includes a tubular adjusting screw 46 which threadably engages the member 42 and is formed on its other end, with a smooth internal portion which is received on the smooth external portion 43 of said end portion 44. The adjusting screw 46 is provided with a rotary wheel 48 to provide rotation of the adjusting screw when the brake assembly is adjusted for wear.

The adjuster 34 further comprises a lever 50 which is carried at the lower end of the brakeshoe 14 in an elongated opening 52. Referring now specifically to FIGS. 1 and 2, the lever 50 is provided with a pawl 54 and a locating element 56 having thereon a tab 58, the locating element 56 and tab 58 being in pivotal engagement with said shoe 14 through the opening 52. A spring 60 is connected between the lower end of brakeshoe 12 and opening of the lever 50. When connected in this manner, the spring 60 tends to rotate the lever 50 in a counterclockwise direction about the point where the locating element 56 engages the elongated opening 52, to thereby position the pawl 54 in engaging relationship with an irregular periphery of the rotary wheel 48. The connection of the spring 60 between the lever 50 and end 36 of the brakeshoe 12 is such as to bring the a pawl 54 into driving engagement with the irregular periphery of the wheel 48. An additional function of the spring 60 is to hold the lower ends 36 and 38 of the brakeshoes 12 and 14, respectively, into operative relationship with respect to the the extendable strut 40.

A cable 64 has one end fastened to the opening 62 of the lever 50 and the other end of the cable securely fixed to the anchor member 30 through a grommet 66. The end of the cable 64 which is connected to the lever 50 is provided with a hooklike fastener 68 which passes through the opening 62 of the lever 50. A cable guide 70 is carried at the upper end of the brakeshoe 14 so as to receive the cable 64 intermediate its ends. The cable guide 70 is formed with a curved flange portion 72 within which the cable is free to slide.

With reference now to FIGS. 1 and 3, the elongated opening 52 is generally D-shaped and comprised of a sliding surface 74 and a camming surface 76. Due then, to the nature of the curvature of the opening 52, its camming surface 76 forces the locating element 56 of said lever 50 into engagement with the sliding surface 74 during all periods when the brakes are inoperable and also during the lower torque levels experienced with normal braking. However, upon braking applications, where excessive torque is developed on the lever 50, the locating element 56 may slide along surface 74 to prevent damage to the brake assembly. More specifically, if the lever 50 cannot be rotated as a result of shoe wear due to malfunctioning of the extendable strut 40, for example, the lever can slide to the right along the elongated opening to relieve the excessive torque applied to cable 64, thus performing in much the same manner as a slip clutch or overtravel mechanism would operate. In assembling the brakeshoe adjuster 34, the spring 60 assumes a preload which rotates the lever 50 about the locating element 56 to thereby position pawl 54 in driving engagement with the rotary wheel and it s irregular periphery 48. The cable 64, which has its ends interconnected respectively to the lever 50 and the anchor member 30 via the cable guide 70, opposes the preload on the spring 60.

The automatic adjuster mechanism described herein, is intended to adjust upon a brake application during reverse movement of a vehicle. However, as will be seen by those skilled in the art, the adjuster mechanism may be comprised of identical structure, but adapted to operate in cooperation with the other brakeshoe, to facilitate automatic adjustment in response to forward movement of a vehicle.

MODE OF OPERATION OF THE PREFERRED EMBODIMENT

The brake adjuster operates on reverse rotation of the vehicle brake drum, as indicated by the arrow A in FIG. 1. Upon application of the vehicle brakes, the hydraulic wheel cylinder 18 is put under pressure so that the brakeshoes 12 and 14 are urged into frictional engagement with the brake drum 16. The frictional engagement of said brake shoes with the drum 16 produces a slight rotation of the brakeshoes in the direction of drum rotation. In this particular case, brakeshoes 12 and 14 as a unit tend to rotate in a clockwise direction with the end 22 of the brakeshoe 12 anchoring on said fixed anchor member 30. The end 24 of the shoe 14 will have pulled away from said fixed anchor member 30 at this time, against the force of the spring 32. This action of the shoes 12 and 14 will tend to rotate the lever 50 about the locating element 56. The amount of rotation of lever 50 about the locating element 56. The amount of rotation of lever 50 about said locating element 56 will depend upon the extent to which the shoes 12 and 14 have rotated with the drum 16. If brakeshoe lining wear has been such as to cause the pawl 54 to rotate the wheel 48 to extend the strut 40 during the brake application, the spring 60 will upon release of the brake application return the lever 50 to reestablish the pawl 54 in the next tooth appearing on the rotary wheel 48. Further, upon release of the brakes, the wheel cylinder 18 will be deenergized and the springs 32 will return the shoe ends 22 and 24 against the fixed anchor member 30.

Although only a single embodiment of my invention has been illustrated, it will be apparent to those skilled in the art that the principles of the invention are broad in scope and are capable of general application. It is intended that such revisions of the invention as are reasonably expected of those skilled in the art will be included within the scope of the following claims.

I claim:

1. A brake assembly when comprising:
   a pair of brakeshoes;
   a fixed anchor member to which each shoe is operatively connected at one end;
   an automatic adjuster for said shoes comprising an extendible strut interconnecting the unanchored ends of said brakeshoes;
   a rotary wheel having a serrated periphery operatively connected to said extendible strut to induce extension of said strut upon rotation of said wheel;
   one of said brakeshoes being provided with an elongated opening in one end thereof;
   a lever means having a locating element pivotally carried in said elongated opening;
   said lever means provided with a pawl which is engageable with said serrated periphery of said wheel;
   resilient means interconnecting said lever to the other of said shoes; and
   other means interconnecting said lever means to said fixed member via said one shoe so that movement of said one shoe away from its anchor member a given amount rotates said lever means and pawl in a direction to turn said wheel to thereby adjust the brake assembly;
   said elongated opening having a sliding surface and a camming surface; and
   said camming surface cooperating with said resilient means and said other means to urge said locating element into engagement with said sliding surface and one end of said elongated opening.

2. An elongated opening as recited in claim 1, wherein said locating element upon application of excessive torque to said lever means will slide along said sliding surface toward the other end of said elongated opening to thereby prevent damage to said brake assembly.